Oct. 11, 1960 R. L. SHELLHAUSE 2,955,887
PISTON SEAL STRUCTURE
Filed Sept. 24, 1958
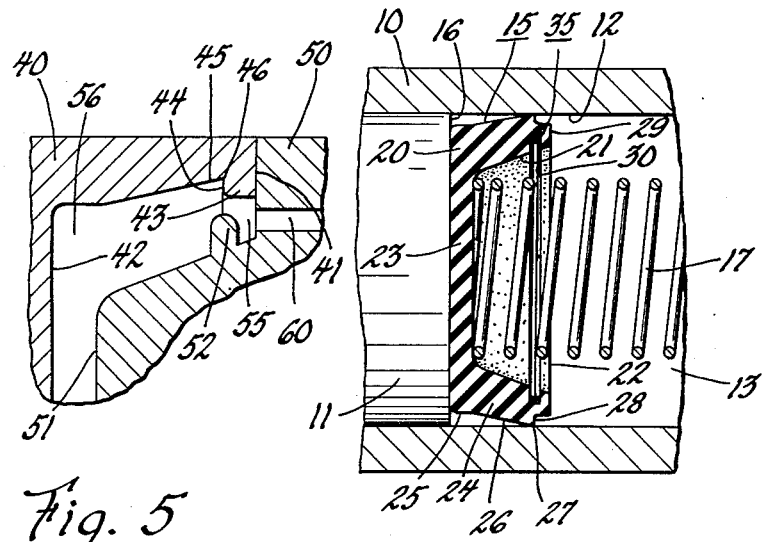
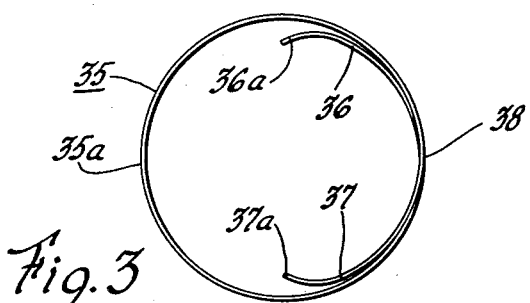
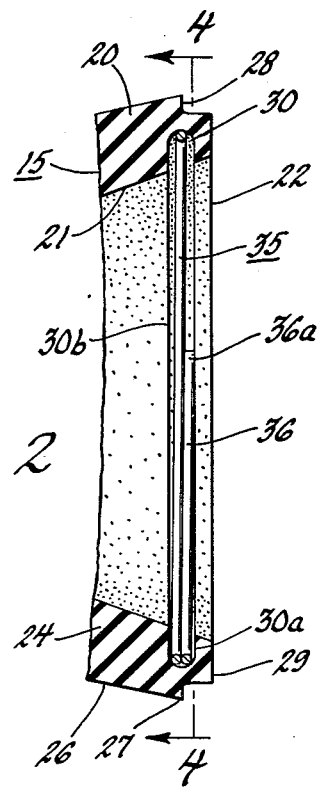
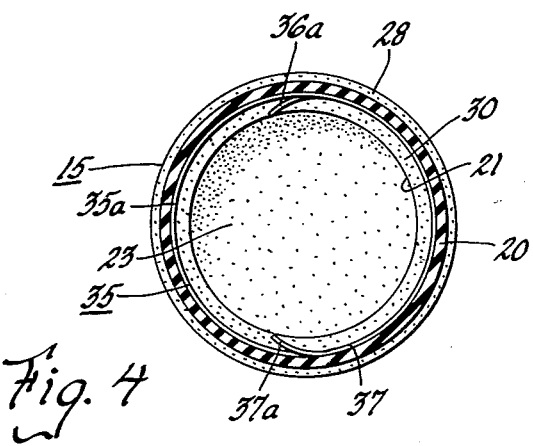
INVENTOR.
Ronald L. Shellhause
BY
D. C. Staley
HIS ATTORNEY United States Patent Office 2,955,887
Patented Oct. 11, 1960

2,955,887

PISTON SEAL STRUCTURE

Ronald L. Shellhause, Dayton, Ohio, assignor to General Motors Corporation, Detroit, Mich., a corporation of Delaware Filed Sept. 24, 1958, Ser. No. 762,990

12 Claims. (Cl. 309—23)

This invention relates to a seal structure that is adapted to be reciprocated within a cylinder in cooperation with a piston member that is within the cylinder and to prevent loss of hydraulic fluid under pressure from within the cylinder between the engaging peripheries of the piston and the cylinder.

In providing a seal between a piston and a cylinder wherein the piston reciprocates within the cylinder, it is many times desirable to maintain the friction against movement of the piston within the cylinder to as low a value as possible. This is particularly true in connection with the hydraulic systems for hydraulic brakes on a motor vehicle, the conventional hydraulic brake system on a vehicle including a wheel cylinder that receives a piston reciprocable therein so that hydraulic fluid pressure admitted into the cylinder will cause the piston to move outwardly relative to the cylinder and thereby apply pressure to the brake shoes of the brake for the vehicle to effect the desired braking operation.

It is desirable to maintain the friction value between the piston and the cylinder of the wheel cylinder for the brake at a low value so that the brake actuating system will be more sensitive with a minimum requirement of pedal effort to be applied manually by the operator of the vehicle in applying the brakes. Also, by providing a seal member between the piston and cylinder wall of the wheel cylinder that has a low friction value, the tendency of the piston to stick within the cylinder is greatly reduced.

It is therefore an object of this invention to provide a seal structure for a piston and cylinder arrangement to prevent loss of hydraulic fluid under pressure from the cylinder between the cooperating peripheral walls of the cylinder and the piston wherein the friction pressure of the seal applied to the wall of the cylinder is maintained at a relatively low value while still maintaining good sealing relationship with the cylinder wall.

It is also an object of the invention to provide a seal structure for a piston and cylinder wherein the radial pressure applied to the seal to retain it in frictional engagement with the wall of the cylinder is maintained relatively constant and uniform around the periphery of the seal.

It is still another object of the invention to provide a seal structure having an annularly positioned lip that is adapted to engage the inner peripheral wall of a cylinder, the seal structure including a spring member arranged in the form of an expanding annulus that is disposed in radial alignment with the sealing lip of the seal structure and substantially in a common plane with the lip so that all radial force of the expanding annular spring will be applied directly to the lip of the seal structure.

It is another object of the invention to provide a seal structure for a piston and cylinder arrangement in accordance with the foregoing objects wherein an annular spring preferably in the form of a spring wire is arranged to have substantially more than one annular turn in the spring but substantially less than two annular turns but with the overlapping turn portions that exceed one annular turn of the spring being disposed in a spiral arrangement extending generally inwardly toward the axis of the annulus formed by the spring so that when the spring member is placed within the seal member in alignment with a sealing with an annular sealing lip on the seal structure the radial force applied by the spring in the overlapping turn portions of the spring to expand the lip of the seal against the cylinder wall will be substantially equal to the radially applied force of the spring in the single turn portion in expanding the lip of the seal structure radially against the wall of the cylinder.

It is a further object of the invention to provide a seal structure for a piston and cylinder arrangement wherein the seal is generally cup-shaped in transverse cross section and has a radially extending lip engageable with the wall of the cylinder, the sealing lip being positioned rearwardly of the forward edge of the seal structure, but adjacent the forward edge whereby the forward edge portion of the seal between the sealing lip and the forward face of the seal provides a structural reinforcement of the sealing edge tending to maintain the sealing edge in uniform pressure engagement with the inner periphery of the cylinder in which it operates.

It is another object of the invention to provide a seal for a piston and cylinder arrangement that is constructed and arranged substantially in accordance with the seal structure of the foregoing object wherein an annular groove is provided in the inner periphery of the cup-shaped seal structure in planar alignment with the sealing lip whereby to obtain a relatively thin structural cross-sectional area radially aligned with the sealing lip whereby to provide for radial flexible expansibility of the sealing lip with the forward edge of the cup-shaped seal structure that extends forward of the sealing edge providing structural reinforcement of the sealing lip to retain the sealing lip more uniform in circular contour and provide for engagement pressure of the sealing lip against the cylinder wall.

It is another object of the invention to provide a seal for a piston and cylinder structure that is constructed and arranged substantially in accordance with the foregoing object wherein the annular groove that is in radial alignment with the sealing lip provides for a partial balancing of hydraulic force acting on the forward end of the seal whereby to limit the unbalance of hydraulic force effective on the end of the seal tending to radially expand the sealing lip into engagement with the cylinder wall and thereby control the hydraulic force effective to expand the sealing lip into engagement with the cylinder wall substantially in proportion to the hydraulic force existing within the cylinder.

Further objects and advantages of the present invention will be apparent from the following description, reference being had to the accompanying drawings wherein preferred embodiments of the present invention are clearly shown.

In the drawings:

Fig. 1 is a cross-sectional view representing a cylinder and piston structure having the seal member of this invention applied thereto.

Fig. 2 is a cross-sectional view of a portion of the seal structure enlarged from that of Fig. 1 showing more particularly the placement of the annularly expansible spring within the seal structure.

Fig. 3 is an elevational view of the annular expansible spring used in the seal structure of this invention, showing the turn arrangement of the spring when in free condition.

Fig. 4 is a cross-sectional view taken along line 4—4 of Fig. 2 to show the position of the spring within the seal structure as part of the assembly.

Fig. 5 is a cross-sectional view of a mold in which the seal of Fig. 2 is formed.

In Fig. 1, there is illustrated a piston and cylinder arrangement incorporating a seal structure of this invention wherein the cylinder 10 receives a piston 11 for reciprocation within the cylinder bore 12 under the action of hydraulic fluid under pressure introduced into the cylinder chamber 13 at the right-hand side of the piston 11. The seal structure 15 of this invention is supported on the forward wall 16 of the piston 11; a compression spring 17 retaining the seal structure 15 against the wall 16 of the piston so that the seal structure 15 will reciprocate with the piston 11 within the cylinder bore 12.

The arrangement just described of the piston, the cylinder and the seal structure is that which is conventionally found in the wheel cylinder of a hydraulic brake system. Hydraulic fluid introduced under pressure into the cylinder chamber 13 will apply pressure to the seal structure 15 and thereby the piston 11 tending to urge the piston outwardly and thereby apply the hydraulic force to the brake mechanism for a brake application. It is, of course, desirable to prevent loss of hydraulic fluid from the chamber 13 between the peripheries of the cylinder 11 and the cylinder bore 12, and for this purpose the seal structure 15 is provided.

The seal structure 15 consists of a generally annularly arranged member 20 having an annular recess 21 extending inwardly into the member 20 from the end 22 of the seal member 20. As shown in Fig. 1, the recess is of generally conical form wherein the seal member 20 is arranged generally in the form of a cup-shaped member, the generally truncated cone-shaped recess forming the inner peripheral wall of the cup-shaped member. With the member 20 being in the form of a cup-shaped element, there is provided a bottom wall 23 generally planar in arrangement and an annularly arranged side wall 24 extending upwardly from the bottom wall 23.

The seal member 20 is supported on the end wall 16 of the piston 11, the spring 17 retaining the bottom wall 23 of the seal member 20 against the end wall 16 of the piston.

The outer periphery of the generally annularly arranged seal member has a cylindrical portion 25 adjacent one end of the seal member 20, which is the end supported by the piston 11. The seal member 20 is also provided with a generally conically arranged peripheral surface 26 that has the small diameter end thereof joining the cylindrical surface 25 of the periphery of the side wall portion. This conically arranged side wall portion 26 extends toward the opposite end wall portion 22 so that the large diameter portion 27 of the conically shaped surface 26 is adjacent the end wall portion 22 and forms a sharp lip edge in cooperation with a radially disposed shoulder surface 28 that extends radially inwardly of the surface 26 forming thereby a sharp edge lip portion at the large diameter edge 27 of the conical surface 26.

This sharp edge lip 27 engages the inner peripheral wall 12 of the cylinder and forms a seal against the cylinder wall 12 that prevents leakage of hydraulic fluid from the cylinder chamber 13 toward the piston 11.

The radially disposed surface 28 terminates at its inner end in an annular surface 29 that joins with the planar surface of the end wall 22, whereby the sealing lip 27 is positioned rearwardly of the forward surface 22 of the seal to provide a structural arrangement in which the sealing lip can be molded as a sharp-edged lip.

The seal member 20, and more particularly the side wall portion 24, has an annular groove 30 extending radially into the side wall portion 24 from the inner peripheral surface 21 of the seal member. This annular groove 30 has the center portion thereof in radial alignment with the surface 28 of the lip 27 so that the groove 30 annulus lies in a plane common with the plane of the surface 28 of the seal member 20.

The lip 27 of the seal member 20 is urged outwardly against the surface of the cylinder by means of an annular spring 35, more particularly shown in Fig. 3. The spring 35 is preferably formed of spring wire into the form of an annulus, as shown in Fig. 3, with the total length of the annular spring including substantially more than one complete turn of the annulus but substantially less than two complete turns. As shown in Fig. 3, the overlapping turn portions 36 and 37 are preformed so that these ends 36 and 37 spiral inwardly toward the axis of the annulus from a mid point or central point 38 between the extremities of the overlapping turn portions. Thus, when the annular spring 35 is compressed for placement within the groove 30 of the seal member 20, the degree of radial compression of the spring 35 will be such as to substantially axially align the end portions 36 and 37 with the main annulus of the spring at the diameter established by the maximum diameter of the groove 30 with the spring properly in position in the groove. This is more particularly shown in Fig. 4.

The end extremities 36a and 37a of the end portions 36 and 37 of the spring are preformed on a shorter radius than the main portions of the end portions 36 and 37 so that these end portions 36a and 37a will not dig into the surface of the groove 30 and thereby tend to cause damage to the seal member by cutting the groove portion.

As shown in Figs. 2 and 4, the spring 35 has a single turn portion 35a in a portion of the periphery of the groove 30 and has overlapping dual end portions in the remaining portion of the groove 30. Without the preforming of the spring, as shown in Fig. 3, the overlapping end portions 36 and 37, if on the same radius as the main annulus of the spring, would create a radial force on the side wall 24 of the seal member in the overlapping turn portion of the spring that would be greater than the radial force applied by the single turn portion of the spring. However, by preforming the ends 36 and 37 of the spring in the overlapping end portions, the radial force applied by the spring in the overlapping end portion will be substantially equal to the radial force supplied by the single turn portion of the spring. This will, therefore, provide a substantially uniform radial pressure outwardly of the entire periphery of the seal member so that the lip portion 27 will seal properly against the surface 12 of the cylinder and only a light sealing pressure will be required for proper sealing engagement.

In the seal structure heretofore described, the effect of the hydraulic force within the cylinder 13 on the seal tending to radially expand the sealing lip 27 into engagement with the cylinder wall 12 is controlled by the depth of the annular groove 30 relative to the juncture between the radial shoulder 28 and the annular surface 29. If the annular groove 30 is not placed in substantial radial alignment with the radial shoulder 28, that is if the groove 30 is eliminated from the structure, the hydraulic pressure in the cylinder 13 will exert its force upon the entire inner periphery of the annular surface 21 so that the sealing lip 27 will be urged against the cylinder wall 13 by the force of the hydraulic pressure in direct proportion to the hydraulic force in the cylinder 13 in undiminished effect.

However, with the annular groove 30 positioned substantially in radial alignment with the radial face 28 that terminates in the sealing lip 27, thus placing the plane of the sealing lip within the confines of the parallel planes formed by opposite faces of the groove 30, the hydraulic pressure within the cylinder 13 also enters the groove 30. With hydraulic pressure existing in the groove 30, the force effect of that pressure on the forward face 30a of the groove and the face 22 of the seal is balanced in the area of the depth of the groove.

Also, the force effect of the hydraulic pressure on the rearward face 30b of the groove 30 is exerted rearwardly of the sealing lip 27 so that the hydraulic force in this portion of the seal will tend only to expand the main body 24 of the seal, it being understood that the position of the seal within the piston and cylinder arrangement of Fig. 1 is illustrative of a condition of assembly of the parts with no hydraulic pressure existing in the cylinder 13.

Thus, there is provided an area of force unbalance on the forward edge of the seal between the annular surface 29 and the bottom of the groove 30 that is effective to radially expand the sealing lip 27 into engagement with the cylinder wall 12, this unbalanced force being controlled and regulated by the spaced relationship of the bottom of the groove 30 and the annular surface 29.

Therefore, even if the spring 35 is not used in the groove 30, there will be a controlled hydraulic force tending to urge the sealing lip 27 against the cylinder wall 12 with the lip 27 rotating about a hinge axis formed between the deepest part of the groove 30 and the juncture between the surfaces 28 and 29. This unbalanced hydraulic force is sufficient to maintain effective sealing of the lip 27 with the cylinder wall 12. It will, therefore, be understood that the seal structure herein described can be used either with or without the spring 35, but, of course, optimum results are obtained when the spring 35 is used in the seal structure, as shown and illustrated in the drawing.

In Fig. 5 there is illustrated a molding die assembly in which the seal member illustrated in Figs. 1 and 2 is produced.

This molding die assembly consists of a first die part 40 and a second die part 50, the respective die parts having a common parting plane 41 formed by a face on the die part 40 and a corresponding face on the die part 50. The die part 40 has a recess 42 extending inwardly from the face of the parting plane 41, which recess is of the exterior contour of the seal member illustrated in Fig. 2. This die part 40 has an annular flange 43 extending radially inwardly into the recess 42 with the first face of the flange being formed by the parting face of the die part and the second radial face 44 spaced from the face formed by the parting plane and terminating at the annular periphery 45 of the recess 42, thereby forming a sharp-edged annular corner 46 that mold forms the sealing lip 27 of the seal member 15.

The second die part 50 has a protrusion 51 that extends into the recess 42 and forms the inner peripheral contour of the seal member 15. This projection 51 has an annular radially extending flange 52 that forms the groove 30 of the seal member, this flange 52 being in a common plane of the face 44 of the flange 43 of the die part 40.

The relationship of the flanges 43 and 52 form an L-shaped cavity 55 that is contiguous with the cup-shaped cavity 56 whereby to form the cross sectional contour of the seal member 15.

The cavity formed by the working association of the die parts 40 and 50 is filled with a resilient material that is cured within the cavity.

In removing the seal member from the die part 40, it will be noted that the seal lip portion of the seal member must be compressed to the inner diameter of the flange 43 to withdraw the seal member from within the cavity 42 of the die part 40. To provide for this construction of the formed seal lip, without damaging the seal lip in withdrawal of it from within the cavity 42, it has been determined that the durometer hardness of the resilient material cannot exceed the range of 50 to 70 durometer, and that the radial face 28 of the seal cannot exceed a range beyond from .010 to .040 in. without causing damage to the sharp seal lip 27.

After the seal member has been withdrawn from the die part 40, it can then be removed from the die part 50 by expanding the L-shaped end portion of the flange 52 of the die part 50.

The mold can be either a compression mold or a transfer mold. If transfer molding is used in filling the cavity formed by the die parts, it is preferable that the sprue 60 be positioned as shown in Fig. 5, or in any other satisfactory position on the surface of the seal with the exception of at or adjacent the corner 46 of the die part 40 that forms the sharp sealing edge 27 of the seal member.

While the embodiments of the present invention as herein disclosed constitute a preferred form, it is to be understood that other forms might be adopted.

What is claimed is as follows:

1. A seal providing a slidable sealing engagement with a cylinder wall for association with a piston reciprocable in the cylinder to prevent loss of fluid between the piston and the cylinder, comprising, an annular sealing member of resilient material having a surface at one end thereof for engagement with an end of a piston for support thereon, said member having an annular recess extending inwardly thereof from the opposite end of the member forming thereby a cup-shaped member having a bottom wall portion and an annular side wall portion, said member having a radially extending knife edged lip on the outer periphery of the said side wall portion adjacent said opposite end and disposed axially inwardly of the said opposite end sealingly engageable with a cylinder wall, said side wall portion having a radially disposed annular groove in the inner periphery thereof aligned radially with the knife edge of said lip, and an annular expansible spring in said groove radially aligned with the edge of said lip to expand the said lip for sealing engagement with the cylinder wall.

2. A seal providing a slidable sealing engagement with a cylinder wall for association with a piston reciprocable in the cylinder to prevent loss of fluid between the piston and the cylinder, comprising, an annular sealing member of resilient material having a surface at one end thereof for engagement with an end of a piston for support thereon, said member having an annular recess extending inwardly thereof from the opposite end of the member forming thereby a cup-shaped member having a bottom wall portion and an annular side wall portion, said member having a radially extending lip on the outer periphery of the said side wall portion adjacent said opposite end sealingly engageable with a cylinder wall, said side wall portion having a radially disposed annular groove in the inner periphery thereof aligned radially with said lip, and an annular expansible spring of substantially more than one annular turn but substantially less than two annular turns in said groove to expand the said side wall for sealing engagement of the lip with the cylinder wall, the end portions of the spring that extend beyond one annular turn thereof spiraling generally inwardly toward the axis of the annulus whereby to provide a radial force on the said side wall of the seal member in the overlapping turn portion of the spring that is substantially equal to the radial force on the said side wall in the single turn portion of the spring.

3. A seal providing a slidable sealing engagement with a cylinder wall for association with a piston reciprocable in the cylinder to prevent loss of fluid between the piston and the cylinder, comprising, an annular sealing member for resilient material having a surface at one end thereof for engagement with an end of a piston for support thereon, said member having an annular recess extending inwardly thereof from the opposite end of the member forming thereby a cup-shaped member having a bottom wall portion and an annular side wall portion, said member having a radially extending knife edged lip on the outer periphery of the said side wall portion adjacent said opposite end sealingly engageable with a cylinder wall, said side wall portion having a radially disposed annular groove in the inner periphery thereof with the center of the groove aligned radially with said lip, and an annular expansible spring of substantially more than one annular turn but substantially less than two annular turns in said groove, the end portions of the spring that extend beyond one annular turn thereof spiraling generally inwardly toward the axis of the annulus from a point midway between the extremities of the overlapping turn portion whereby to provide a radial force on the said side wall of the seal member in the overlappnig turn portion of the spring that is substantially equal to the radial force on the said side wall in the single turn portion of the spring.

4. A seal structure arranged in accordance with claim 1 wherein the annular expansible spring comprises a spring wire.

5. A seal structure arranged in accordance with claim 3 wherein the annular expansible spring comprises a spring wire.

6. A seal providing a slidable sealing engagement with a cylinder wall for association with a piston reciprocable in the cylinder to prevent loss of fluid between the piston and the cylinder, comprising, an annular sealing member of resilient material having a surface at one end thereof for engagement with an end of a piston for support thereon, said member having an annular recess extending inwardly thereof from the opposite end of the member forming thereby a cup-shaped member having a bottom wall portion and an annular side wall portion, said member having a radially extending knife edged lip on the outer periphery of the said side wall portion adjacent said opposite end sealingly engageable with a cylinder wall, said side wall portion having an annular groove in the inner periphery thereof disposed in a common plane with the edge of said lip and extending radially into the said side wall portion relative to the axis of the said member, and an annular expansible spring in said groove to expand the said side wall portion for sealing engagement of the lip with the cylinder wall with the sealing force directed radially of the axis of the said member and in the said common plane, said annular expansible spring having substantially more than one annular turn but substantially less than two annular turns, the end portions of the spring that extend beyond one annular turn thereof spiraling generally inwardly toward the axis of the annulus whereby to provide a radial force on the said side wall of the seal member in the overlapping turn portion of the spring that is substantially equal to the radial force on the said side wall in the single turn portion of the spring to effect substantial uniformity of spring pressure in the plane of the said lip for sealingly engaging the lip with a cylinder wall.

7. A seal providing a slidable sealing engagement with a cylinder wall for association with a piston reciprocable in the cylinder to prevent loss of fluid between the piston and the cylinder, comprising, an annular sealing member of elastomeric material having a surface at one end thereof for engagement with an end of a piston for support thereon, said member having an annular recess extending inwardly thereof from the opposite end of the member forming thereby a cup-shaped member having a bottom wall portion and an annular side wall portion, said member having an annular surface on the outer periphery of the said side wall portion extending outwardly from the generally cylindrical outer periphery of the side wall portion with the said surface disposed generally in the form of a conical surface and projecting from adjacent the said one end of the said member toward the said opposite end of the said member with the face of the cone formed by the said surface disposed adjacent the said opposite end and forming thereby an annular knife edged lip extending radially outwardly of the generally cylindrical surface of the outer periphery of the said member, said side wall portion having a radially disposed annular groove in the inner periphery thereof with the center of the groove aligned radially of the edge of said lip, and an annular expansible spring of substantially more than one annular turn but substantially less than two annular turns in said groove to expand the said side wall and thereby said lip into sealing engagement with a cylinder wall, the end portions of the spring that extend beyond one annular turn thereof spiraling generally inwardly toward the axis of the annulus whereby to provide a radial force on the said side wall of the seal member in the overlapping turn portion of the spring that is substantially equal to the radial force on the said side wall in the single turn portion of the spring whereby to establish a substantial uniformity of spring force for sealingly engaging the said lip with a cylinder wall.

8. A seal structure arranged substantially in accordance with the structure of claim 7 wherein the said annular expansible spring comprises a spring wire with the axis of the spring wire aligned radially with the edge of said lip, the said spring lying in a plane common with the said lip.

9. A seal providing a slidable sealing engagement with a cylinder wall for association with a piston reciprocable in the cylinder to prevent loss of fluid between the piston and cylinder, comprising, an annular sealing member of elastomeric material having a surface at one end thereof for engagement with an end of a piston for support thereon, said member having an annular recess extending inwardly thereof from the opposite end of the member forming thereby a cup-shaped member having a bottom wall portion and an annular side wall portion, said member having an outer peripheral surface from nearly adjacent the said one end thereof to nearly adjacent the said opposite end arranged in the form of a conical surface with the cone formed by the surface enlarging in the direction of the said opposite end of the said member, said conically arranged outer peripheral surface of the said side wall portion at the base portion of the said cone formed thereby terminating in a surface disposed at right angle to the axis of said member and forming thereby with said conically arranged surface a sharp edged lip disposed adjacent said opposite end of said member, said side wall portion also having a radially disposed annular groove extending outwardly from the inner peripheral surface thereof with the center of the groove aligned radially with said right angularly disposed surface of the lip and positioned in a common plane with said lip, and an annular expansible spring in said groove to expand the said side wall and thereby said lip into sealing engagement with a cylinder wall.

10. A seal providing a slidable sealing engagement with a cylinder wall for association with a piston reciprocable in the cylinder to prevent loss of fluid between the piston and cylinder, comprising, an annular sealing member of elastomeric material having a surface at one end thereof for engagement with an end of a piston for support thereon, said member having an annular recess extending inwardly thereof from the opposite end of the member forming thereby a cup-shaped member having a bottom wall portion and an annular side wall portion, said member having an outer peripheral surface from nearly adjacent the said one end thereof to nearly adjacent the said opposite end arranged in the form of a conical surface with the cone formed by the surface enlarging in the direction of the said opposite end of the said member, said conically arranged outer peripheral surface of the said side wall portion at the base portion of the said cone formed thereby terminating in a surface disposed at right angle to the axis of said member and forming thereby with said conically arranged surface a sharp edged lip disposed adjacent said opposite end of said member, said side wall portion also having a radially disposed annular groove extending outwardly from the inner peripheral surface thereof with the center of the groove aligned radially with said right angularly disposed surface of the lip and positioned in a common plane with said lip, and an annular expansible spring of spring wire of substantially more than one annular turn but substantially less than two annular turns in said groove to expand the said side wall and thereby said lip into sealing engagement with a cylinder wall, the end portions of the spring that extend beyond one annular turn thereof spiraling generally inwardly toward the axis of the annulus of the spring whereby to provide a radial force on the said side wall and thereby on said lip of the seal member of the overlapping turn portion of the spring that is substantially equal to the radial force on the said side wall and thereby on said lip in the single turn portion of the spring to effect thereby substantially uniform radially applied pressure to said lip around the periphery thereof that engages a cylinder wall.

11. A seal providing a slidable sealing engagement with a cylinder wall for association with a piston reciprocable in the cylinder to prevent loss of fluid between the piston and cylinder, comprising, an annular sealing member of resilient material having a surface at one end thereof for engagement with an end of a piston for support thereon, said member having an annular recess extending inwardly thereof from the opposite end of the member forming thereby a cup-shaped member having a bottom wall portion including said surface and an annular side wall portion, said side wall portion having an annular peripheral surface arranged in the form of a truncated cone with the small diameter of the said cone adjacent the said surface and the large diameter of the said cone terminating and joining with a generally radially positioned surface extending inwardly toward the axis of the cone thereby forming a sharp-edged annular seal lip engageable with a cylinder wall, said seal lip being disposed rearwardly of the forward edge of said seal but closely adjacent thereto, said side wall portion also having an annular groove extending radially into the said side wall portion from the inner periphery thereof and disposed in the plane of said seal lip and forming thereby an annular portion in said side wall portion of a cross-sectional thickness substantially less than the cross-sectional thickness of said side wall portion disposed in a plane extending through said groove and said seal lip, the positioning of said groove in said side wall portion in the plane of said lip forming thereby a side wall portion in advance of said lip and groove of substantially L-shaped transverse cross section to structurally reinforce the said seal lip at the thick cross section between said groove and said seal lip.

12. A seal providing a slidable sealing engagement with a cylinder wall for association with a piston reciprocable in the cylinder to prevent loss of fluid between the piston and the cylinder, comprising, an annular sealing member of resilient material having a surface at one end thereof for engagement with an end of a piston for support thereon, said member having an annular recess extending inwardly thereof from the opposite end of the member forming thereby a cup-shaped member having a bottom wall portion including said surface and an annular side wall portion, said side wall portion having an annular peripheral surface arranged in the form of a truncated cone with the small diameter of the said cone adjacent the said surface and the large diameter of the said cone terminating and joining with a generally radially positioned surface extending inwardly toward the axis of the cone thereby forming a sharp-edged annular seal lip engageable with a cylinder wall, said seal lip being disposed rearwardly of the forward edge of said seal but closely adjacent thereto, said side wall portion also having an annular groove extending radially into the said side wall portion from the inner periphery thereof and disposed in the plane of said seal lip and forming thereby an annular portion in said side wall portion of a cross-sectional thickness substantially less than the cross-sectional thickness of said side wall portion disposed in a plane extending through said groove and said seal lip, the positioning of said groove in said side wall portion in the plane of said lip forming thereby a side wall portion in advance of said lip and groove of substantially L-shaped transverse cross section to structurally reinforce the said seal lip at the thick cross section between said groove and said seal lip, the said L-shaped cross section portion providing for an unbalance of hydraulic force to effect radial expansion of the said seal lip controlled by the spaced relationship between said groove and the radially inward terminus end of said radial surface that forms said seal lip.

References Cited in the file of this patent

UNITED STATES PATENTS

| | | |
|---|---|---|
| 1,769,984 | Bockius | July 8, 1930 |
| 2,155,207 | Stoker | Apr. 18, 1939 |
| 2,483,093 | Harvey | Sept. 27, 1949 |
| 2,691,558 | Smith | Oct. 12, 1954 |
| 2,777,741 | Vielmo | Jan. 15, 1957 |